Feb. 6, 1973   G. H. TEEPLE, JR., ET AL   3,715,035
HIGH CAPACITY PORTABLE WATER PURIFIER
Filed April 12, 1971
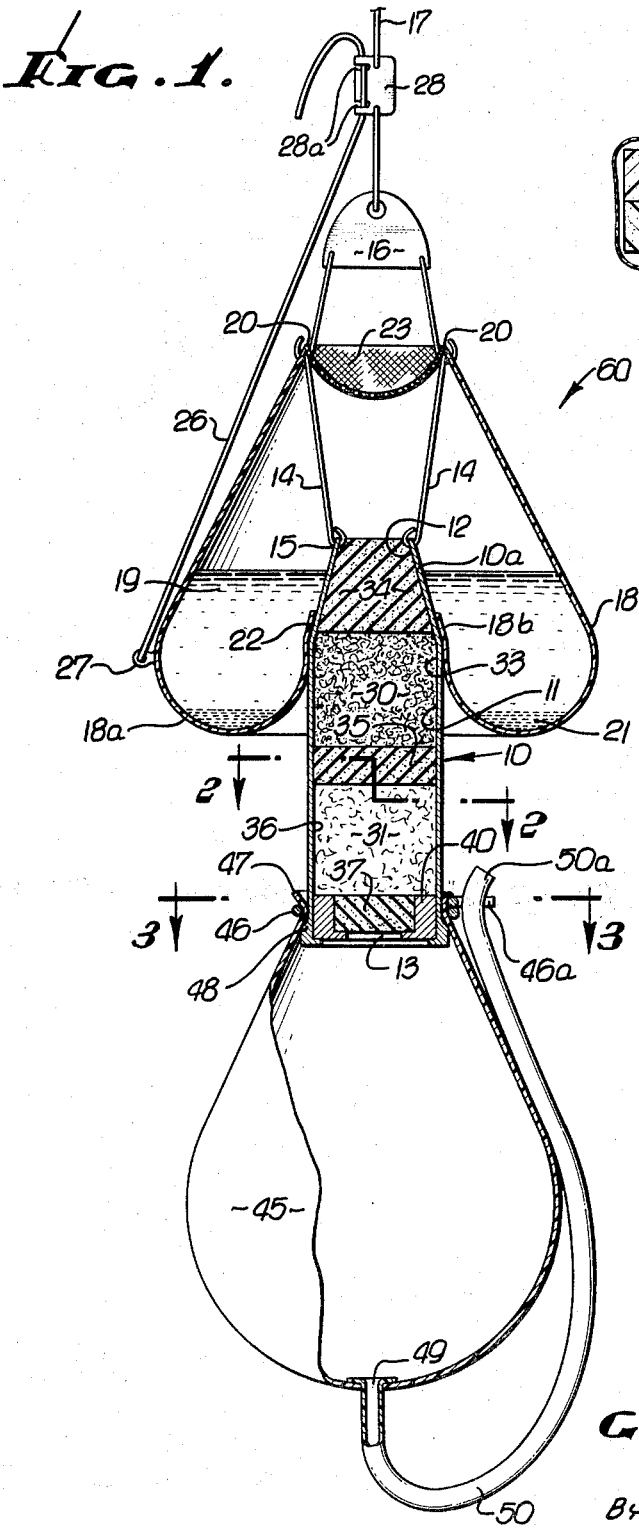
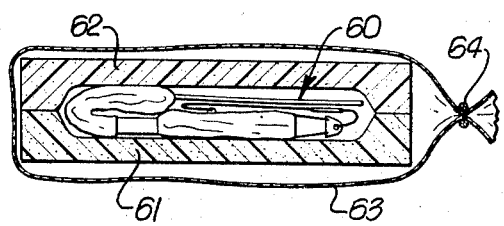
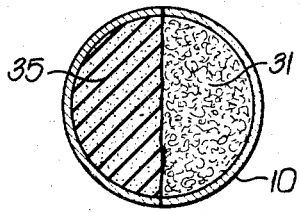
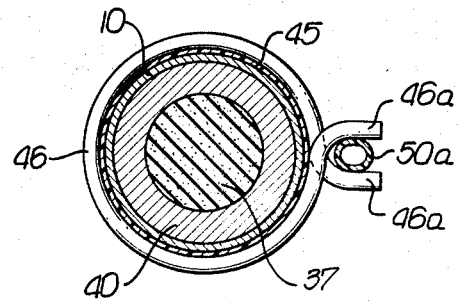
INVENTORS
GIFFORD H. TEEPLE, JR.
JAMES W. WELSH
BY
White, Haefliger & Bachand
ATTORNEYS.

United States Patent Office 3,715,035
Patented Feb. 6, 1973

3,715,035
HIGH CAPACITY PORTABLE WATER PURIFIER
Gifford H. Teeple, Jr., 720 26th St., Manhattan Beach, Calif. 90266, and James W. Welsh, 776 North First East, Logan, Utah 84321
Filed Apr. 12, 1971, Ser. No. 133,252
Int. Cl. B01d 29/08
U.S. Cl. 210—249   16 Claims

ABSTRACT OF THE DISCLOSURE

A high capacity, portable water purifier comprises:
(a) Lower container means having an upper inlet and a lower outlet, said container means adapted to contain particulate media for treating liquid,
(b) Support structure for said lower container means, and
(c) Upper container means including a flexible bag adapted to receive and hold liquid to be purified, the upper container means suspended by said support means so that said bag extends below the level of said lower container means inlet, and the bag interior communicating with said inlet so that liquid in the bag may be caused to flow to said inlet in response to elevation of the upper container means relative to the lower container means.

BACKGROUND OF THE INVENTION

This invention relates generally to filtering apparatus, and more particularly concerns the provision of portable, collapsible water purification apparatus of high capacity.

Efficient water purification involves removal from raw water of suspended material and sediment, harmful bacteria and heavy metal and salt ions. There is particular need for high capacity apparatus to perform these functions, as in emergencies such as during floods and other natural catastrophies. While devices have been built in the past to perform these functions, no prior device of which we are aware and capable of such performance, has embodied the characteristics of portability, high capacity, collapsibility and low-cost construction as are found in the present apparatus.

SUMMARY OF THE INVENTION

It is a major object of the invention to provide an efficient, high capacity, portable water purifier that will remove from non-salt water sources objectionable taste and odor and other water borne contaminants. An added object is to provide a high capacity unit so simple in construction and operation as to require only gravity as a working feed-force, and/or means to control flow through the filter apparatus, as desired.

Basically, the filter assembly comprises, in combination:
(a) A lower container means having an upper inlet and a lower outlet, and adapted to contain particulate media for treating liquid;
(b) Support structure for the lower container means; and
(c) Upper container means including a flexible bag adapted to receive and contain liquid to be purified, the upper container to be suspended by the support structure so that the bag extends below the level of the lower container inlet, and the bag interior communicating with that inlet so that liquid in the bag may be caused to flow to the inlet in response to elevation of the bag. As will be seen, the bag may be suspended to extend closely about a substantially rigid duct forming portion of the lower container means, thereby to form a sediment trap, and the particulate media such as activated charcoal and de-ionizing resin may be contained within compartments of the rigid duct.

As will be seen, particle entrapping porous filter media may separate the charcoal and resin compartments, and may be located at the entrance and exit of the rigid duct, whereby additional filtering as well as flow regulation may be achieved. Further, a second flexible bag may be suspended by the apparatus to receive purified water discharge from the duct, and an elevatable discharge line may be connected with the second bag. In addition, first bag elevating means may be provided, as will be seen, and the entire assembly may be encapsulated within an outer container means to prevent contamination and to enable air-dropping into disaster zones for use by inhabitants needing purified water.

These and other objects and advantages of the invention, as well as the details of an illustrative embodiment, will be more fully understood from the following description and drawings, in which:

DRAWING DESCRIPTION

FIG. 1 is a vertical section showing one portable filter assembly incorporating the invention;
FIG. 2 is a horizontal section taken on line 2—2 of FIG. 1;
FIG. 3 is a horizontal section taken on line 3—3 of FIG. 1; and
FIG. 4 is a vertical section taken through packaging for the portable filter assembly.

DETAILED DESCRIPTION

In the drawings, a lower container means may include a substantially rigid portion 10 forming an upright duct 11. Portion or body 10 may advantageously be tapered upwardly at 10a to form an upper inlet 12 for liquid to flow downwardly toward outlet 13. Support means for the lower container means may include flexible lines 14 suitably attached at 15 to the body portion 10 and suspended by hanger 16. Another line 17 is adapted to suspend the hanger and be suitably carried as from a tree in the area where sportsmen are encamped.

Also provided is what may be referred to as upper container means including a flexible bag 18 adapted to receive and hold liquid (such as stream water 19) to be purified. The upper container means is suspended by the support means in such manner that the bag 18 extends below the level of inlet 12, the bag communicating with the inlet 12 so that liquid in the bag may be caused to flow to inlet 12 in response to bag elevation relative to that inlet 12. For example, the bag 18 may be suspended at 20 from the support lines 14 to hang closely about the body 10 below inlet level 12, whereby a sediment trap is formed by the lower portion 18a of the bag, collected sediment being seen at 21.

A coarse inlet filter or strainer 23 may be located at the bag inlet or mouth to filter large particles from water poured into the bag inlet, the strainer being shown as a cup-shaped sieve. The bag outlet will be understood as formed by annular portion 18b through which body 10 projects and to which portion 18b is bonded at 22. Bag 18 may consist of a suitable flexible plastic (as for example polyethylene) or other material, and body 10 may consist of polyvinylchloride or other material.

Elevation of the bag 18 relative to inlet 12 may be facilitated by elevating means connected with the bag. For example, a line or lines 26 may be connected at 27 with the bag lower portion 18a, the line upper end being releasably suspended by a holder 28 through which the main force of apparatus suspension is transmitted. Line 26 may be released from frictional attachment to the holder (as via interfit in slots 28a), elevated to lift the bag 18, and re-attached to the holder 28 whereby operation of the filter is made controllable.

The body 10 is shown as containing particulate media for treating liquid such as water flowing downwardly to outlet 13. Such media, for example, may include activated charcoal at 30 (having bacteriacidal effect) and/or de-ionizing resin particles at 31. The latter acts to remove heavy metal and salt ions from the water, and may consist of cationic and/or anionic material obtainable, for example, from Rohm and Haas Company.

Charcoal particles 30 may be retained in compartment 33 between a first particle entrapping porous body 34 located at inlet 12, and a second particle entrapping porous body 35 located just above compartment 36 containing the resin particles 31. Finally, a third particle entrapping porous body 37 is located proximate outlet 13. The bodies 34, 35 and 37 may advantageously consist of porous plastic sponges (as for example polyurethane), and for progressive filtering action the porosities of the sponges 34, 35 and 37 may, for example, have porosities of about 60, 80 and 100 pores per inch, and consist of "Scott" industrial foam. Further, the foam may be treated to have anti-bacterial and anti-fungus properties, Dupont "Thyrin" being added to the unexpanded material that forms the sponge upon expansion, for example. The sponges may be suitably connected to the duct portion 10 as by bonding.

Lower sponge 37 may have reduced cross dimension, as shown, and be bonded to an annular insert 40 in body 10, to act as a flow regulator or restriction means; accordingly, water is retained in the duct 10 for sufficient time for the desired treatment effect, treated water then exiting at 13 for discharge or storage, as desired.

For unusually advantageous storage purposes, the lower container means may include a second flexible bag 45 suspended by the duct 10 to receive purified water or other liquid flow from the treatment media. Such suspension may be effected by means of a spring ring 46 surrounding the upper neck 47 of bag 45 and urging it inwardly against the cylindrical body 10. Note that a ledge 48 may be formed by body 10 to seat the spring ring 46, and that the latter may have terminals 46a extended as shown in FIG. 3 to be available for pinching together in order to release the bag neck 47.

Bag 45 has a lower outlet at 49 to pass water to a flexible discharge line 50. The discharge terminal 50a of the latter may be releasably retained at an upper level seen in FIG. 1 by interfit in the turned terminal 46a of the spring ring. When water flow is desired, the end 50a is released and lowered.

FIG. 4 shows a method of packaging the collapsible filter apparatus 60 within separable, rigid plastic foam shell sections 61 and 62. The latter may be enclosed within a plastic film bag 63, sealed at 64 against contamination. Accordingly, the package may be air-dropped into flooded regions for recovery by stranded inhabitants. The filter may be removed from the clean interior of the package and set up for use as a source of pure water.

I claim:

1. In a portable filter assembly, the combination comprising:
   (a) lower container means having an upper inlet and a lower outlet, said container means adapted to contain particulate media for treating liquid,
   (b) support structure for said lower container means,
   (c) upper container means including a flexible bag adapted to receive and hold liquid to be purified, the upper container means suspended by said support means so that said bag extends below the level of said lower container means inlet, and the bag interior communicating with said inlet so that liquid in the bag may be caused to flow to said inlet in response to elevation of the upper container means relative to the lower container means, and
   (d) elevating means connected with said upper container means to elevate said bag relative to said lower container means.

2. The combination of claim 1 wherein said flexible bag is suspended to extend closely about a substantially rigid duct forming portion of the lower container means thereby to form a sediment trap laterally of said duct forming portion.

3. The combination of claim 1 including said media in said lower container means.

4. The combination of claim 3 wherein the lower container means has a substantially rigid duct forming portion containing said media.

5. The combination of claim 4 wherein said media includes activated charcoal.

6. The combination of claim 4 wherein said media also includes de-ionizing resin.

7. The combination of claim 4 including a particle entrapping porous body located in the path of liquid flow via said lower container means inlet to said media.

8. The combination of claim 6 including a particle entrapping porous body located in the path of liquid flow between said charcoal and resin which are in separate zones.

9. The combination of claim 1 wherein said lower container means includes a second flexible bag adapted to receive purified liquid flow from said media.

10. The combination of claim 9 including a particle entrapping porous body located in the path of liquid flow from said media to said second bag.

11. The combination of claim 9 wherein said lower container means outlet is located at the lower portion of the second bag.

12. The combination of claim 11 including a flexible line communicating with said outlet, and structure carried by the assembly to removably retain the discharge end of said line at a raised elevation relative to said outlet.

13. The combination of claim 1 wherein said support means has operative attachment to said lower container means via the interior of said upper container means.

14. The combination of claim 1 wherein said bag has an upper inlet and is attached to said support means above the level of said lower container means inlet.

15. The combination of claim 14 including a filter at the bag inlet.

16. The combination of claim 1 including outer container means receiving the assembly in collapsed condition.

References Cited
UNITED STATES PATENTS

| | | | |
|---|---|---|---|
| 3,224,586 | 12/1965 | Wade | 210—282 |
| 590,020 | 9/1897 | Myers | 210—265 |
| 3,217,887 | 11/1965 | Meister | 210—249 X |
| 3,327,859 | 6/1967 | Pall | 210—282 X |

SAMIH N. ZAHARNA, Primary Examiner

U.S. Cl. X.R.
210—265, 282, 284